Patented July 17, 1923.

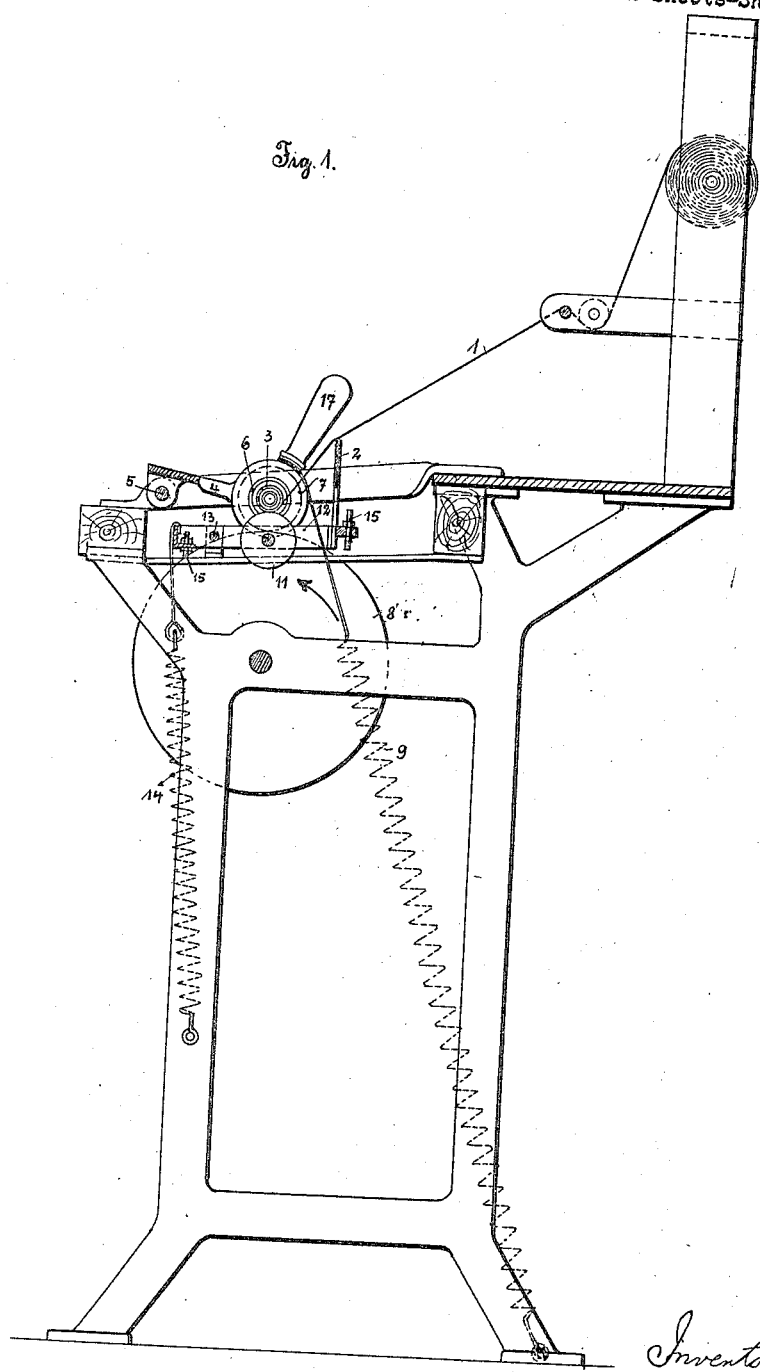

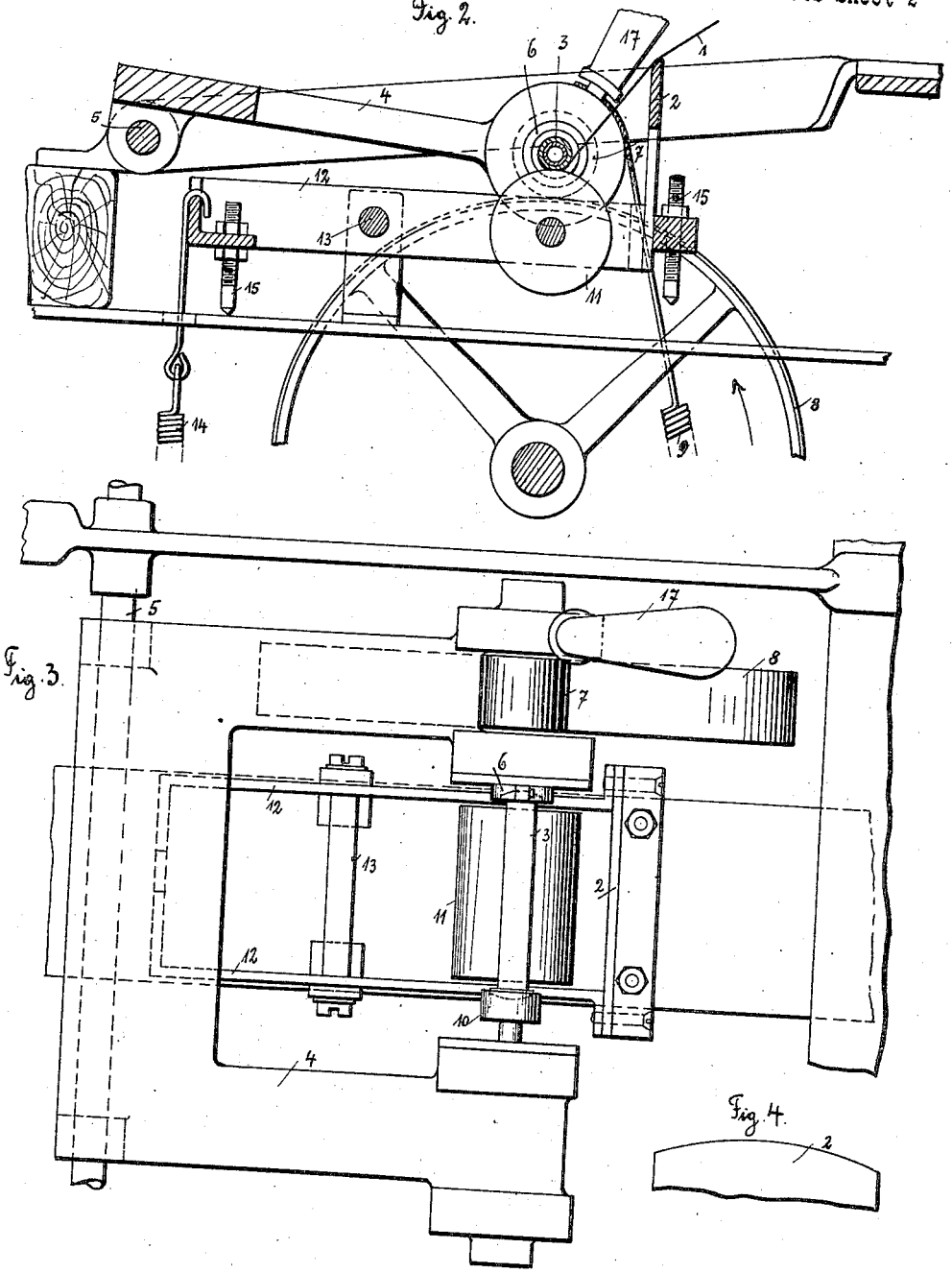
July 17, 1923.
G. M. WEHNER
DISK SPOOLING MACHINE
Filed May 24, 1921
1,461,953
2 Sheets-Sheet 2
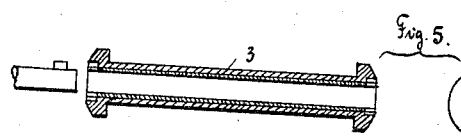

1,461,953

UNITED STATES PATENT OFFICE.

GEORG MAX WEHNER, OF DRESDEN, GERMANY.

DISK SPOOLING MACHINE.

Application filed May 24, 1921. Serial No. 472,076.

*To all whom it may concern:*

Be it known that I, GEORG MAX WEHNER, a citizen of the Republic of Saxony, Germany, residing at Dresden, Germany, have invented certain new and useful Improvements in a Disk Spooling Machine, of which the following is a specification.

Spool winding devices particularly for winding disk spools with yarn are already known in which the thread coming from a fixed eye, or the like, is led by a surface bearing resiliently against the spool and contacting with the spool along a line parallel to the longitudinal axis of the spool in order to form coils adjacent one another on the spool. As in this case there is contact always along a line with the spool or with the thread position, this guide surface may be formed differently from the usual style of plane surface as a rod or roller, the longitudinal axis of which is parallel to that of the spool.

It is also already known to arrange the device for holding the spool on the one end of a lever which is provided with a friction roller, and for the purpose of bringing into gear the spooling device to press this lever with its friction roller against the periphery of the driving wheel so that the friction roller of the lever which roller is mounted on the hollow spindle carrying the spool is thus driven by friction. When the spool increases in size with the windings it presses resiliently against the thread regulating surface. This pressure has already been used to disconnect the means which press the spool carrier against the driving mechanism. It is thus already known to utilize the increase in size of the spool after the desired amount has been wound on to disconnect the spool carrier from the drive by the pressure of the guiding surface.

The disk spool machine forming the subject of the present invention operates on these principles. It is, however, characterized by this that the spool carrier is pressed resiliently against the driving mechanism, and in opposition to this spring action the thread regulating surface is pressed under a smaller pressure against the spool. Due to the increase in size of the spool the surface is pressed against a fixed projection and any further increase in size on the spool releases the spool carrier from its drive by overcoming the pressure of its spring. It has been found that in this manner a very exact winding of the spool and a very exact stoppage of the spool drive is attainable at the desired moment in machines having high output.

The new machine is illustrated in the drawing in which Fig. 1 is an end elevation partly in vertical section. Fig. 2 is a side view and Fig. 3 a plan. Fig. 4 shows the thread guide in detail, and Fig. 5 shows the mode of attachment of the spool.

As shown the thread 1 to be wound is led over a guide 2 to the spool 3. The spool is fixed in a spool carrier which is formed as a single armed lever 4 rotatable about the adjusting rod 5. This lever seen from above is of U-shaped form. At the free ends of the arms of this U-shaped member are provided known means for receiving and holding the spool. One end of the spool is fitted in the hollow head 6 of a spindle to which is secured the driving roller 7. This driving roller rests on the periphery on a driving wheel 8, a spring 9 engaging a spool carrying lever 4 serving to press the friction roller down of the periphery of the driving wheel 8.

The other end of the spool is fitted in a head 10 the spindle of which is resiliently pressed forwards, whereby the spool 3 is held between the two heads 6 and 10 and is rotated therewith.

In order to regulate the position of the thread there is provided a roller 11. This roller is carried by a double-armed lever 12 which is formed as a rectangular frame, and swings on bolts 13 carried by the frame. On the free end of this double-armed lever 12 engages a tension spring 14 having substantially the same direction as the spring 9 acting on the lever 4.

This spring pulls down the rear end of the frame 12 and the front end thereof pushes up the roller 11 against the spool 3 contact between these two members taking place along a line parallel to the longitudinal axis of the spool.

The roller 11 causes the thread being wound to be wound in uniform adjacent coils on the spool. The lever 12 is provided at its rear free end with a downwardly projecting pin 15 which may bear on the adjusting plate 16. This has for its object to prevent unnecessary movement of the lever 12 when the lever 4 is raised say by a handle 17. In such case if the means for preventing swinging of the lever be absent, it would rise unnecessarily following the spring 14.

At the end opposite the spring 14 the lever 12 is provided with an adjusting screw 15', the axis of which lies in the plane of movement of the lever. The downwardly projecting end of the adjusting screw extends towards the adjusting plate 16.

The relative tensions of the springs 9 and 14 are so arranged that the spool carrying lever 4 is pulled downwards with a greater force than that with which the end of the double-armed lever 12 carrying the roller 11 is pressed upwards by the spring 14. When the thread 1 is wound on the spool 3 and the thickness of winding is increased by successive layers of thread the roller 11 and also the lever 12 overcoming the tension of the spring 14 is moved by the amount of increase in the coils until the lower end of the adjusting screw 15' bears on the plate 16. The adjusting screw allows regulation as desired of the thickness of the spool. As soon as the adjusting screw contacts with the plate 16 the lever 12 becomes rigid and further movement cannot take place. Further additional coiling of the spool then causes the lever 4 overcoming the tension of the spring 9 to be raised. The raising movement effects as a direct consequence the lifting of the roller 7 of the spool spindle running on the driving wheel 8.

At the moment when the roller 7 is raised from the driving wheel 8, the drive of the spool spindle ceases. It is stopped and the winding of the spool is thus automatically stopped at the desired point.

The thread 1 is led over the curved guide or strap 2.

As the thread passes from a fixed eye, the distance from one eye to the spool alters continuously, the distance being greatest when the thread is at one end of the spool, and least when the thread is at the middle of the spool.

The curvature of the guide 2 serves to counteract this effect since it imparts a greater tension to the thread as it runs over the upper central portion when being led to the middle of the spool than when the thread is guided towards one end thereof. Consequently the thread retains always the same tension when the guide 2 is properly curved. This formation of the thread guiding surface ensures a uniform thread tension and a uniformly tight winding of the spool the curvature of the strap regulating or effecting proper guiding of the thread.

The forces acting between the roller 11 and the spool or the coil thereon produced by the tensions of the springs 9 and 14 both during the coiling operation and on the later raising of the spool carrier from the drive, necessitate the provision of means for ensuring rotation of the spool with the spool spindle. It is not sufficient that the spool end should be held by friction in the hollow spindle head 6 as was previously usual.

It is in fact necessary that the spool end should be provided with a transverse slot 18 as shown in Fig. 5 and a transverse pin 19 should be inserted in the spindle head which may fit in the transverse slot. In this simple manner the spool is caused to rotate with the spindle without making the insertion or removal of the spool any more difficult than it is when the spool is held only by friction in the hollow spindle head.

Having now particularly described and ascertained the nature of my said invention and in what manner the same is to be performed, I declare that what I claim is:—

1. In a spooling machine the combination of a spool carrying mechanism having a driving roller, a driving wheel, a thread regulating mechanism having a roller adapted to roll in contact with the spooled yarn, a spring connected with the spool carrying mechanism and operative to force the driving roller thereof in contact with said driving wheel, a weaker spring connected with said thread regulating mechanism and operative to press its roller in contact with the winding spool in yielding opposition to said spring connected with the spool carrying mechanism until said spool is filled to a determinate point, and means for arresting at the determinate point the yielding action of said thread regulating mechanism, whereby the spool carrying mechanism is disconnected from the driving mechanism and stopped.

2. In a spooling machine the combination of a spool carrying mechanism having a driving roller, a driving wheel, a thread regulating mechanism having a roller adapted to roll in contact with the spooled yarn, a spring connected with the spool carrying mechanism and operative to force the driving roller thereof in contact with the driving wheel, a weaker spring connected with said thread regulating mechanism and operative to press its roller in contact with the winding spool in yielding opposition to said spring connected with the spool carrying mechanism until said spool is filled to a determinate point, means for arresting at the determinate point the yielding action of said thread regulating mechanism, whereby the spool carrying mechanism is disconnected from the driving mechanism and stopped, and an adjusting device for said arresting means.

3. In a spooling machine the combination of a driving wheel, a spool carrier having a driving roller adapted for contact with said driving wheel, a spring engaging said spool carrier and operative to press said driving roller in contact with said driving wheel, a pivoted thread regulator, a spring of less tension than the spool carrier spring and operative to yieldingly press said regulator against the yarn of the winding spool supported in said carrier, and a stop operative to arrest said thread regulator at a determined point indicative of a full spool.

4. In a spooling machine the combination of a driving wheel, a spool carrier having a driving roller adapted for contact with said driving wheel, a spring engaging said spool carrier and operative to press said driving roller in contact with said driving wheel, a pivoted thread regulator, a spring of less tension than the spool carrier spring and operative to yieldingly press said regulator against the yarn of the winding spool supported in said carrier, a stop operative to arrest said thread regulator at a determinate point indicative of a full spool, and means for adjusting the engagement of said thread regulator with said stop.

5. In a spooling machine the combination of a driving wheel a two armed pivoted spool carrier having a driving roller adapted for contact with said driving wheel and provided with means for holding the spool, a spring operative to press said spool carrier roll in contact with said driving wheel, a thread regulator consisting of a two armed pivoted lever provided with a roller adapted to engage the yarn wound on said spool, a spring adapted to spring said thread regulator lever to press said guide roller against said yarn, a stop plate, and an adjustable pin on said regulator lever adapted to engage said stop plate.

In testimony whereof I affix my signature in presence of two witnesses.

GEORG MAX WEHNER.

Witnesses:
JOHANNA SCHAFER,
CHARLOTTE HEYNE.